United States Patent [19]

Kiss

[11] Patent Number: 4,469,655
[45] Date of Patent: Sep. 4, 1984

[54] PROCESS AND APPARATUS FOR MOULDING ARTICLES FROM BINDER-CONTAINING ORGANIC FIBROUS MATS

[76] Inventor: Günter H. Kiss, Gustav-Freytag-Strasse 7, D-1000 Berlin 33, Fed. Rep. of Germany

[21] Appl. No.: 424,408

[22] Filed: Sep. 27, 1982

[30] Foreign Application Priority Data

Oct. 13, 1981 [DE] Fed. Rep. of Germany ....... 3141064
Sep. 3, 1982 [DE] Fed. Rep. of Germany ....... 3233241

[51] Int. Cl.$^3$ ............................................. C04B 14/15
[52] U.S. Cl. ..................................... 264/82; 264/324; 425/112; 425/115
[58] Field of Search .................. 264/324, 82; 425/112, 425/115

[56] References Cited

U.S. PATENT DOCUMENTS

| 2,402,554 | 6/1946 | Irvine et al. ......................... 428/296 |
| 2,944,291 | 7/1960 | Prior et al. ............................. 264/82 |
| 3,280,237 | 10/1966 | Corbin et al. ......................... 264/109 |
| 3,758,357 | 9/1973 | Akerson et al. ..................... 264/324 |
| 3,839,521 | 10/1974 | Robinson ............................... 264/82 |
| 3,891,738 | 6/1975 | Shen ................................... 264/101 |

FOREIGN PATENT DOCUMENTS

| 1276912 | 4/1964 | Fed. Rep. of Germany . |
| 1212297 | 9/1966 | Fed. Rep. of Germany . |
| 2402440 | 9/1974 | Fed. Rep. of Germany . |
| 884896 | 12/1961 | United Kingdom . |

OTHER PUBLICATIONS

Graser, Temperaturverlauf in Industriell Gefertigten Spanplatten waehrend des Pressvorgangs, BASF 1963.

Primary Examiner—James R. Hall
Attorney, Agent, or Firm—Curtis, Morris & Safford

[57] ABSTRACT

A process, with the associated apparatus, forms molded articles from binder-containing organic fibres. The process uses pressure to achieve temperatures of more than 100° C. The material is preferably in the form of fibrous mats containing up to 50% heat-hardening binder and having a processing moisture content of more than 5% and preferably 10 to 25%. The compression of the material structure takes place in a single mold stroke, optionally accompanied by additional shaping. With the mold closed, steam pressure is produced during the minimum curing time of the binder in a closed, material-containing volume. The mold is maintained at a superatmospheric pressure. Additional steam can be introduced before or during this time. Following the minimum curing time, the steam pressure and moisture in the molded material are reduced without any significant change to the mold temperature and during steam pressure release the molding pressure is not reduced below a value required for keeping the mold steam tight and for maintaining a surface pressure. This molding pressure is at least equivalent to the steam pressure in the material. At the end of steam pressure release, the molding pressure is released and the mold is opened for removing the workpiece.

15 Claims, 12 Drawing Figures

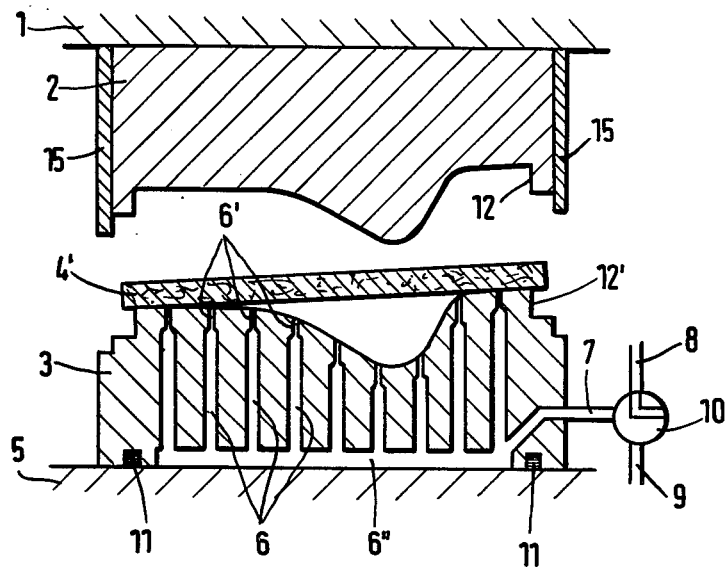
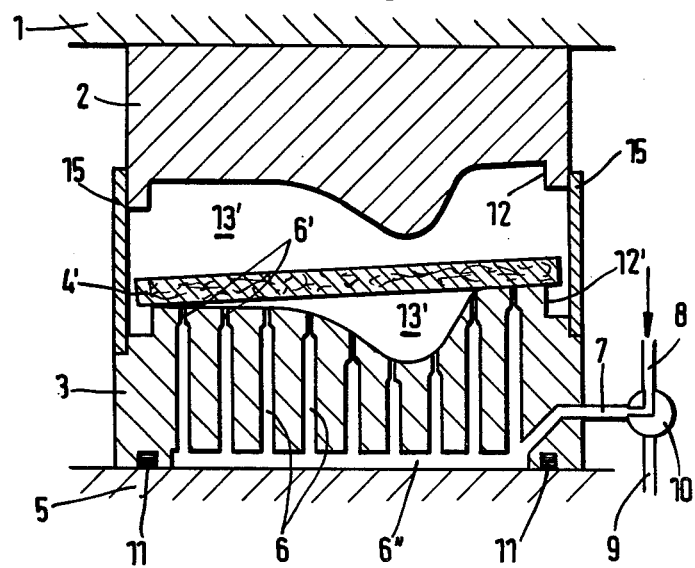

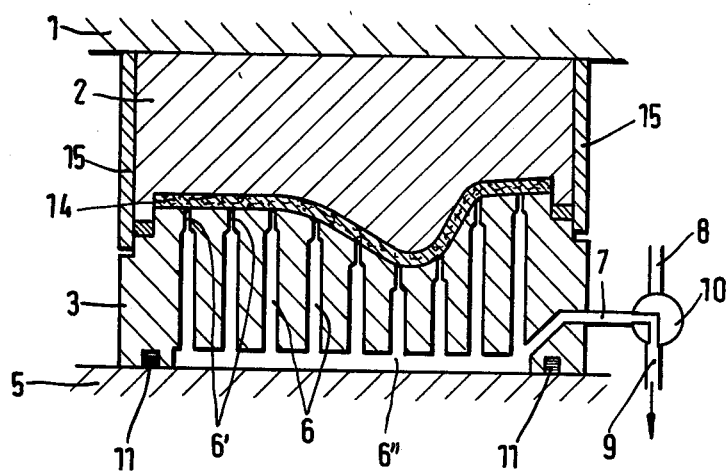
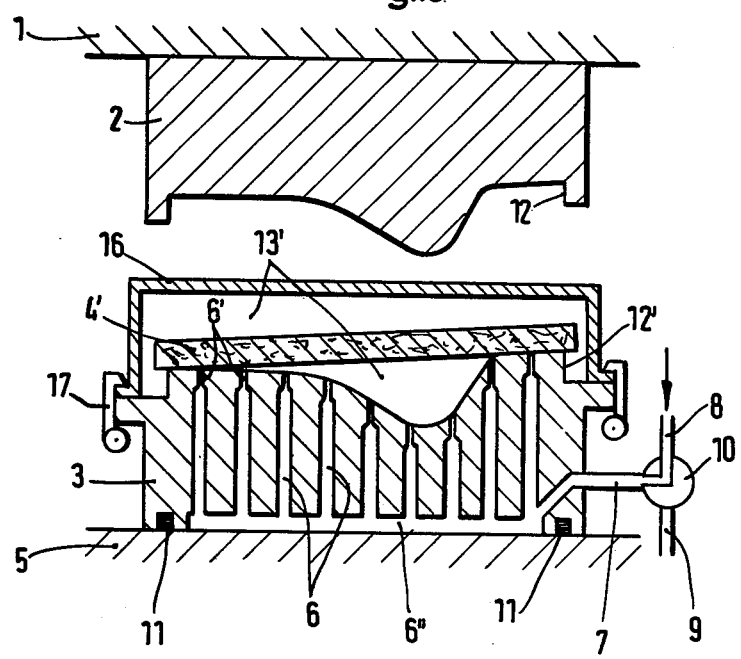

PROCESS AND APPARATUS FOR MOULDING ARTICLES FROM BINDER-CONTAINING ORGANIC FIBROUS MATS

This invention relates to a process for molding articles from binder-containing organic fibrous mats.

Such processes are well known (see, Kollman—Holzspanwerkstoff, Berlin/Heidelberg/New York 1966, pp. 354 to 357). In this known process, wood chip materials (e.g., wood particles or wood shavings) mixed with a binder are placed between two hot plates, and the temperature of the plates is maintained, e.g., at 140° to 180° C. The materials are subjected to pressure, and the processing moisture, on contact with the hot plates, of the material produces a steam jet. The temperature within the actual wood chip material can only rise slightly above 100° C., because the steam immediately escapes via the open plate edges. Thus, there is a continuous moisture extraction process throughout the entire molding period, combined with a corresponding pattern of evaporative heat removal from the wood chip material throughout the molding process. The cooling of the interior of the wood chip material because of this heat removal, despite preheating of the molding plates to a relatively high level, leads to relatively long binder curing times. This occurs because the steam is at atmospheric pressure. Thus, the known system, which is open to release the steam pressure, operates with molding times which, in the most favorable case, are still longer than 2½ minutes. Moreover, the known system achieves, at an adequate moisture extraction from the material, a final moisture content of at least 8%. The relief of the mold members, occurring at the end of the molding process, is independent of the steam pressure within the wood chip material, because the steam that escapes via the edges remains at atmospheric pressure.

Modern binder-containing organic fibrous materials, particularly if they are in the form of fibrous mats made from lignocellulose or the like, advantageously have less than 50% of thermosetting binder admixtures; preferably the admixtures are between 5 to 25%, the presently used mold temperatures being between 160° and 230° C.

The curing of binder used is greatly dependent on the temperature. Curing can be achieved within the fibrous material during the molding process; as an approximation, it can be stated for increased temperatures, the speed of curing is roughly doubled for each 10° C. As the temperature of the fibrous material to be molded is approximately the same as the steam temperature formed during the molding process due to the temperature stabilizing effect of the processing moisture, in the aforementioned process, the free escape of steam over the entire circumferential surface of the fibrous mat prevents the curing time from being shortened, even by further raising the temperature of the mold. So long as steam is free to escape, the only consequence of raised mold temperatures is to chemically decompose or even burn the surfaces of the fibrous mats to be molded.

Thus, in accordance with what has been stated hereinbefore, the processing moisture of the fibrous material to be molded has an unavoidable influence on the molding times. On the one hand, the moisture evaporating continuously during the molding time accelerates heat transfer. On the other hand, the removal of evaporation heat from the fibrous material directly leads to its cooling and at the same time the necessary reduction of the moisture content to the required final moisture content leads to unacceptably long molding times.

Apart from this so-called open molding process, in which the processing moisture can continuously escape at the open edges between the mold halves during the entire molding process, so-called closed processes are also known. In these processes, the steam formed in the fibrous work product can only escape to a limited extent during the molding process. In a typical closed process, initially the requisite molding pressure is built up; then on succesive occasions the pressure briefly reduced again by slight raising of the molds from one another, so that the full molding pressure is again used. When molding in this way, each stage of the release of the building-up steam pressure results in a loosening of the compressed fibrous structure. Consequently, for the following renewed compression, only part of the partially already hardened thermosetting binder is available. As a result, the quality of the molding to be produced is seriously impaired.

Another known process is the so-called "Thermodyn process" (of U.S. Pat. No. 2,402,554) which is also a steam-tight, closed molding process of the type described hereinbefore. Throughout the time the mold halves are closed, the fibrous material to be molded undergoes the building-up of steam pressure due to the heating of processing moisture contained in the material. However, this steam pressure is then slowly drawn off to the free atmosphere before opening the mold halves. This is done if the inherent chemical conditions in the cellulose fibres, have automatically formed binders at the elevated temperatures used and if, under the chemical reactions taking place, the elevated temperatures can lead to the destruction of the fibrous characteristics of the starting material. The synthetic resin-like binders produced through the decomposition of the substance inherent in the wood, despite the high steam pressures and the consequently elevated temperature, are characterized by minimum production times of approximately 10 minutes and are consequently completely unsuitable for the extremely short mold cycles now required in the production of molded parts. In addition, the molding time is determined not only by the minimum production time of the synthetic resin-like binders, but also by the curing time required for the binder after it has been formed; i.e., the cycle time is at least the sum of the minimum production and curing times of the binders produced as a result of the decomposition of the wood fibres. The cycle time for this molding process is further lengthened by the slow evaporation of the steam pressure that builds up in the press after the end of the molding time and before the molds are opened. This interval is expressly required by the prior art.

All the prior art processes have considerable disadvantages, which can be summarized as follows:

1. When molding between molding plates open at the edges, the evaporation of the moisture takes place at approximately atmospheric pressure, so that the steam pressures reached only correspond to the boiling point of the water at this pressure; i.e., temperatures of only a little above 100° C. are reached in the material due to convective heat transfer, although the mold temperatures may be much higher. This leads to a correspondingly low curing rate of the binder in the material, and eventuates in long molding times.

2. When molding semifinished or finished parts in the intermediate stroke process, in the intermediate stroke the steam pressure of the initially pressurized molding is completely released. As a result, the material structure is loosened and the binding power is partially lost, so that the quality of the finished part is impaired. In addition, the very slow pressure relief needed for the intermediate stroke, and the intermediate stroke itself, require increased expenditure for mold control means. The total molding time is considerably increased by the intermediate relief and intermediate stroke, as well as by the necessary long evaporation time.

3. The thermodyn process with hot molds closed in a steam-tight manner requires, from an economics standpoint, virtually unacceptable energy expenditure, yet achieves only very long minimum production times for the binder and greatly lengthened molding times.

For resolving the steam pressure problem, it has been previously proposed to provide the molds with steam relief bores, which permit an unimpeded escape of steam from the mold halves to the atmosphere throughout the molding time. A similar procedure is adopted in the wet-process production of hardboards or fibrous moldings, in which molding preferably takes place on perforated molds. In such a procedure, the conditions with regards to steam removal are much the same as in chipboard molding. As stated hereinbefore, such a measure can indeed reduce the steam pressure in the finished part, but only at the cost of reduced mold temperatures (approximately 100° C.); here again it is not possible to reduce the overall molding time.

A principal object of the present invention is to provide a process of the aforementioned type, and apparatus for performing the process, which are improved in such a way that much shorter cycle times can be obtained, accompanied by a better utilization of the binder characteristics, while avoiding the risk of bubble formation or other inhomogeneities in the molded materials and while simultaneously providing a better energy balance.

This object is achieved by a process including the steps of exposing a fibrous mat between two mold halves to a temperature above 100° C., reducing the moisture content during the molding process to a minimum of 8%, and compressing the fibrous mat in a single mold stroke. In this process, the processing moisture is maintained in the fibrous mat between the mold halves only during a minimum curing time of the added binder, with the closed mold halves being steam tight and defining between them an article volume. Steam resulting from the processing moisture is accumulated in an additional buffer volume connected to the molded article volume. The moisture content of the fibrous mat is reduced to the final moisture content by suddenly releasing the buffer volume.

This process can be further enhanced in various ways, for example, by first introducing external steam into the buffer volume to increase the processing moisture content of the fibrous mat. Also, at the end of the process, the steam from the fibrous mat can be released through the buffer volume into the free atmosphere.

The problems attendant with continuous steam removal approximately at atmospheric pressure, with the resulting disadvantageous low mold temperature, are unavoidable in the known single-stage molding processes, i.e., those processes without intermediate pressure relief and without intermediate stroke. However, these problems are avoided by the process according to the present invention. The present process obviates the forced linking of the release of the steam pressure with the relief of the mold pressure, and also avoids the resulting multi-stage nature of the molding pressure cycle which is also unavoidable when molding is carried out in closed molds.

According to the present invention, there is a clear separation between the steam pressure relief and the molding pressure relief. Advantageously, throughout the molding time there is a single-stage molding pressure action on the material, i.e., without any intermediate removal of this pressure, and the elevated steam pressure building up in the hot molding process is held back in a closed material volume. Throughout the molding time the elevated steam temperature corresponding to the elevated steam pressure is maintained. Thus, the binder can be cured at an elevated temperature and without intermediate cooling. After a time interval, hereinafter referred to as the minimum curing time, the binding force of the binder is sufficient to maintain the structural compression resulting from the molding pressure, even after removing the finished part from the mold. This prevents any swelling of the material due to natural fiber elasticity. The constant presence of the superheated steam up to this time shortens the minimum curing time, as compared with known processes. E.g., the minimum curing time at a material temperature of 120° C. is only approximately a quarter of that required at a corresponding temperature of 100° C. It is only upon reaching the minimum curing time and while continuing the molding pressure action on the mold that there is a steam pressure reduction to atmospheric pressure. Following this, the mold is opened, i.e., there is pressure relief of the molded material.

The considerable steam pressure for the process, formed of most of the superheated steam and similar gas pressure components formed through the vaporization of water and other volatile constituents, is held back in a closed volume which also contains the material.

In the case of limited material-processing moisture contents, which do not significantly exceed 5%, it may be appropriate to produce and/or maintain the necessary steam pressure by introducing external steam at an appropriate pressure into the aforementioned volume.

According to the present invention, the mold pressure is kept high until the time of steam pressure reduction. Consequently, the molds are kept closed in steam-tight manner and the surface pressure exerted by the molds on the material corresponds at least to the steam pressure within the material. During steam pressure relief and moisture removal the material structure is not loosened. Thus, the binding force of the binder used can be fully utilized.

The steam pressure and moisture reduction after the minimum curing time, and while maintaining the mold pressure, has a further advantage which additionally shortens the molding time. There are high steam pressure in the material at the end of the minimum curing time and a high heat content of the actual material due to the elevated material temperature. These ensure that the steam pressure reduction and moisture removal can take place in extremely short times. For this purpose, only a few seconds are required. With considerably reduced cycle times, the product procedure according to the invention can obviate all the aforementioned disadvantages of the prior art.

Throughout the molding process of this invention, the superheated steam held back in a closed pressure volume has temperatures well above 100° C., so that the setting or curing of the binder addition is considerably accelerated. Any inhomogeneities in the strength of the molded material are avoided. The high-pressure steam formed from the material by vaporizing the moisture content during hot molding and optionally by driving out other gaseous components of the mat or binder, are kept approximately at mold temperature up until the relief of steam pressure at the end of the single-stage molding process. To achieve this, the steam can flow into hollow cavities provided in at least one mold half, e.g., in the form of slots, bores, or similar gas chambers. The constant elevated steam pressure and temperature while maintaining the mold pressure reduces the molding time by shortening the binder curing time to approximately one third of the required times hitherto. The steam pressure relief, due to the thermal capacity of the superheated material volume prior to mold pressure relief leads to the residual moisture being removed before the mold pressure is removed.

Advantageously, steam pressure relief can take place by means of a pressure compensation valve to the external air. When it is desired, the energy content of the superheated steam can be captured and possibly recycled to the process, by means of a heat converter or by condensation of the steam in a cooling trap.

The mold volume, which contains the material and during the molding process forms a closed steam pressure area, can be formed as random pattern or other arrangement of surface recesses. These recesses can be designed so as not to clog during the molding process, and are preferably formed in part from bores or surface slots distributed uniformly or non-uniformly over the molding area of at least one mold half. These recesses can be interconnected, and, if desired, can be connected to a further associated buffer volume.

The reduction of the steam pressure before relieving the mold pressure between the mold halves can be carried out chemically, e.g., by hydrophilic materials, rather than or in addition to the aforementioned technique of controllably releasing the steam from the mold. This pressure reduction can also involve thermal removal by cooling traps or heat converters.

Finally, and importantly, the material recesses in the form of bores, slots or the like in at least one of the compressing and/or shaping mold half surfaces for the inside diameter thereof are smaller than the average fiber, chip length, or particle size of the material, while their mean spacing should be at least double the inside diameter or opening width of the recesses.

The invention is described in greater detail hereinafter with reference to the drawings, which merely represent exemplified embodiments and which diagrammatically show, in each case in the same view, the different stages of the molding process according to embodiments of the invention. In the drawings:

FIG. 7 illustrates a further embodiment in a process stage corresponding to that shown in FIG. 1.

FIG. 8 shows the embodiment of FIG. 7 in a process stage corresponding to that shown in FIG. 3.

FIG. 9 shows the embodiment of FIG. 7 in a process stage corresponding to that shown in FIG. 4.

FIG. 10 is a further embodiment.

Figure 1:
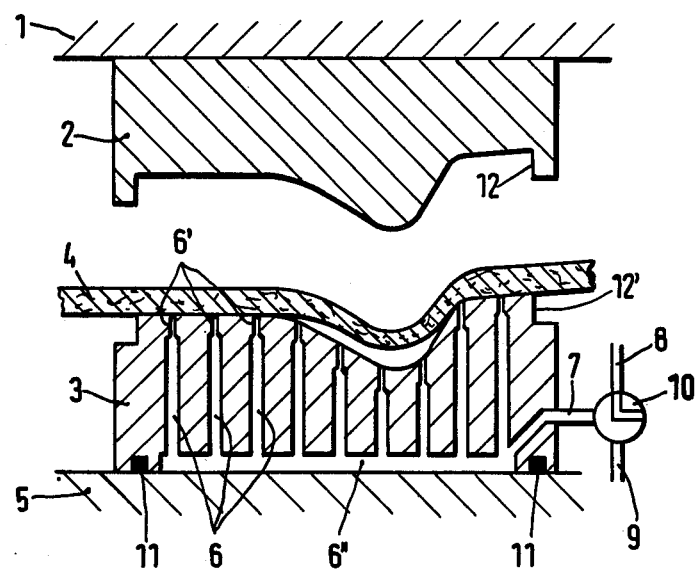
FIG. 1 illustrates the open position of the mold with an inserted preshaped fibrous mat.

FIG. 1 illustrates the starting position for a molding operation, into which a preshaped lignocellulose mat 4 has been inserted. An upper heatable mold half 2 is fixed to the movable crosshead 1 of the mold. Heating means associated with the upper mold half 2 or with a lower mold half 3 are well known and thus not shown. The lower mold half 3, which is connected to a mold plate 5, contains an additionally provided buffer volume which is formed by bores 6, connecting bores 6', and connecting slots 6", which are interlinked with the bores 6. By means of packings 11, the buffer volume is sealed with respect to the mold plate 5. By means of bore 7, said buffer volume is connected to a three-way valve 10 in such a way that it can be connected, as desired, to an external steam supply line 8 or a steam pressure release line 9. Three-way valve 10 is closed in the starting position shown in FIG. 1.

Preshaped lignocellulose fibre mats generally have a moisture content which is below about 15%. Thus FIG. 2, in the same diagrammatic sectional view, illustrates how the preshaped lignocellulose mat 4 receives the moisture content necessary for performing the process, to wit, by introducing externally supplied steam into the buffer volume. This steam is hereinafter referred to as "external steam". For this purpose, the three-way valve 10 is switched so that the external steam supply line 8 is connected by the bore 7 to the buffer volume 6, 6'. By means of the connecting bores 6', this external steam can penetrate and dampen the preshaped lignocellulose mat 4. As shown diagrammatically in FIG. 2, the external steam passes into the atmosphere after penetrating the preshaped lignocellulose fiber mat 4. The passage of the external steam through the preshaped mat 4 dampens the latter and improves its deformation characteristics.

Figure 2:
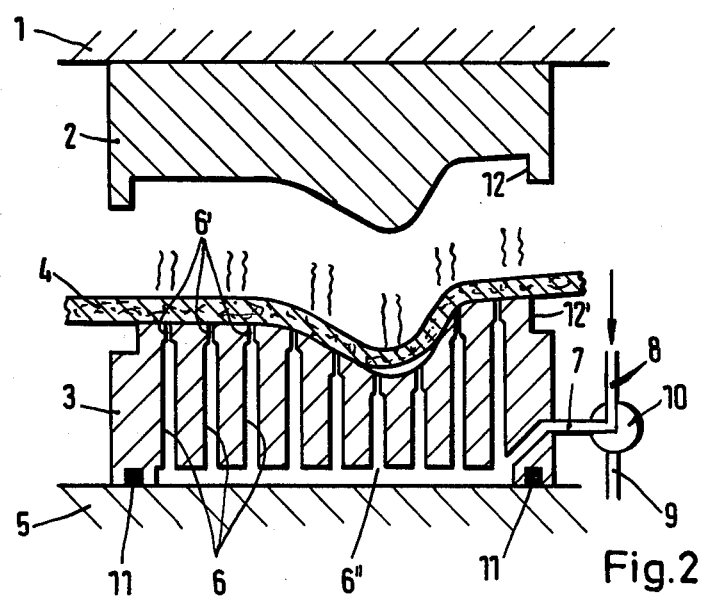
FIG. 2 shows the steaming of the fibrous mat.

The introduction of the processing moisture into the preshaped fibrous mat at atmospheric pressure, in the manner shown in FIG. 2, has however the disadvantage that a relatively large amount of external steam is required and that the temperature rise in the mat does not exceed 100° C. (i.e., the condensation temperature of the external steam).

Figure 3:
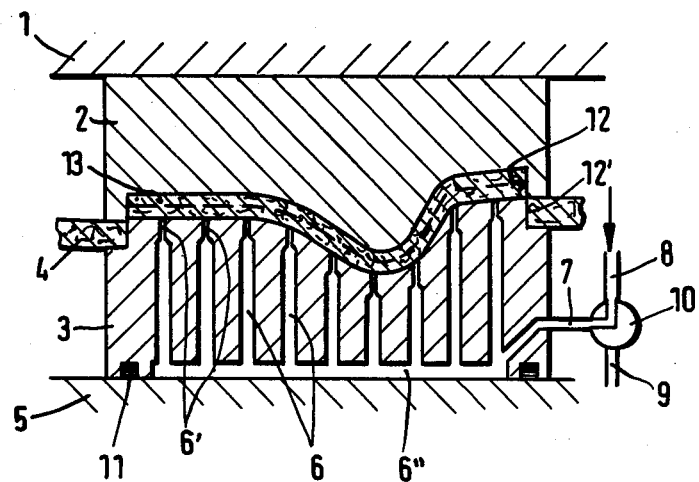
FIG. 3 shows the mold in its steam-tight closed position.

Thus, FIG. 3 in a similar view illustrates a favorable alternative. By means of projecting and set-back clipping edges 12, 12' of the mold halves bonding the contour of the finished part, an additional volume 13 is formed, which is closed and contains the as-yet-uncompressed material of the preshaped fibrous mat 4. The supply of external steam (through elements 8, 10, 7, 6", 6 and 6') takes place in the additional, closed volume 13, bounded by the mold surfaces (2, 3, 12, 12'), which are heated to such a level that no steam condenses thereon. Thus condensation only takes place in the partially heated material 4 and consequently the desired moistening is obtained. A corresponding overpressure (i.e., pressure above ambient atmospheric pressure) can be maintained with the aid of the external steam in the described additional volume 13, so that the material moistening can take place at average temperatures higher than 100° C. Simultaneously, the demand for external steam is reduced to a mininum, so that the process can be performed less expensively.

The length of the clipping edges 12, 12' is such that the sum of their free lengths is smaller than, or approximately the same as the thickness of the uncompressed fibrous mat 4.

As shown in FIGS. 2 and 3, after moistening the material of the preshaped lignocellulose fibrous mat 4, the latter is compressed by further closing of members 1 and 5 under molding pressure and the molding is completed. During this process, the three-way valve 10 is closed, or remains in the position shown in FIG. 3 if the external steam tension can be chosen sufficiently high.

Figure 4:
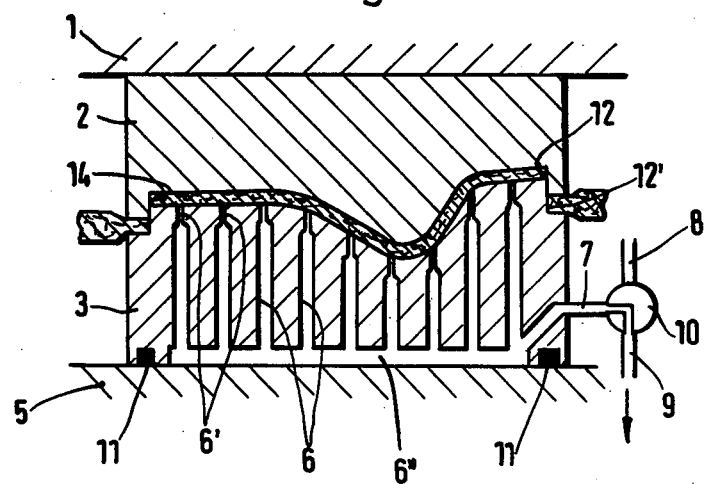
FIG. 4 shows the final stage of the hot molding process.

FIG. 4 shows the end of hot molding, at which there is a sudden moisture removal from the molded part. At the end of the minimum curing time for the added binder, the three-way valve 10 is rapidly brought into the illustrated position, i.e., connecting bore 7 of buffer volume 6" is connected to the atmosphere or an equivalent relief volume. The superheated steam which has accumulated in the buffer volume is under high pressure, and therefore escapes suddenly. Equally suddenly, the moisture still contained in steam form in molded part 14 rapidly passes through connecting bore 6' and out of the buffer volume. The rapid moisture removal is further aided by the high temperatures that the complete molded article has assumed, which are well over 100° C. In other words, the corresponding high stored heat of the finished part accelerates moisture removal.

The phase of the sudden moisture removal of the finished molding shown in FIG. 4 is characteristic for all the various embodiments of the invention and is consequently not described in detail again hereinafter.

Figures 5, 6:
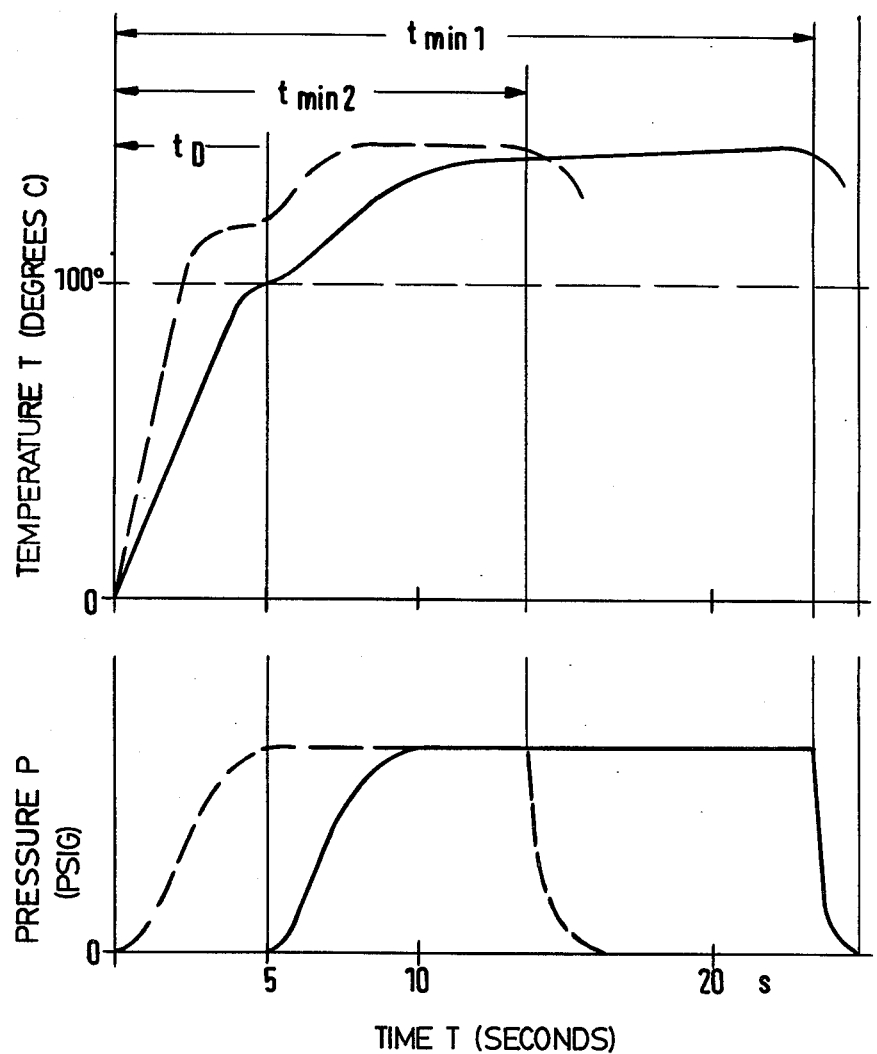
FIGS. 5 and 6 are temperature and pressure graphs, respectively.

FIGS. 5 and 6 are graphs that respectively illustrate the temperature and pressure conditions prevailing during the process of FIGS. 1 to 4. The pressure and temperature curves within the fibrous material 4 are shown in continuous lines for the moistening of the type represented in FIG. 2 and by broken lines for the moistening of the type represented in FIG. 3.

FIG. 5 shows the corresponding temperature curves. If moistening takes place with external steam at atmospheric pressure, the fibrous material temperature does not rise during the moistening phase to above 100° C. This moistening or dampening interval is designated by $t_D$ in FIGS. 5 and 6. Only during the final molding of the fibrous material, when the member formed by components 6, 6', 6" is closed by the engagement of clipping edges 12, 12', does the material temperature rise above 100° C. in the closed volume as a result of the high temperature of the mold halves 2 and 3. Accordingly, an elevated steam pressure occurs, with the associated rise in the steam temperature to above 100° C.

However, if moistening takes place according to FIG. 3, i.e., if external steam at a correspondingly high temperature is passed at a superatmospheric pressure through the fibrous material into an additional closed volume 13, the heating of the material can take place more rapidly. This occurs because there are no steam losses into the atmosphere. From the outset the higher steam pressure with the associated high steam temperature brings the entire closed volume quickly to the higher pressure (broken lines—FIG. 6) and higher temperature (broken lines—FIG. 5). It can be gathered from FIGS. 5 and 6 that when moistening the fibrous material in a closed system (FIG. 3), it is possible to achieve from the outset a faster heating of the material, higher material temperatures, and a higher pressure in the material, than is possible when moistening at atmospheric pressure (FIG. 2).

According to the present invention, during the minimum curing time of the added binder, the processing moisture content in the fibrous mat is maintained in that the steam obtained as a result of the processing moisture is accumulated in an additional buffer volume connected to the molded article volume. Through the reduction of the moisture content to the final moisture content, taking place by a sudden relief of the buffer volume, the cycle time of the process is reduced. This occurs because the high steam pressure in the molded part and the buffer volume means that the temperature associated therewith is well above 100° C.; accordingly, the chemical reaction of the binder is accelerated, i.e., the minimum curing times ($t_{min1}$) are lowered compared with the prior art. At least part of the processing moisture of the fibrous mat is supplied by introducing steam into the buffer volume at the start of the molding process; this can take place because the external steam is supplied through the buffer volume to the fibrous mat 4 and from the latter the steam can be removed to the atmosphere. However, it is more favorable, as shown in FIGS. 5 and 6, if the steam from the buffer volume is passed through the fibrous mat into a further closed volume. This permits a further reduction in the overall cycle time by further shortening the minimum curing time ($t_{min2}$) of the binder.

If the intention is not to use preshaped fibrous mats to which part of the processing moisture is supplied by external steam, injection of steam into a particularly favorable additional closed volume through the fibrous mat is not easily carried out, because it is not feasable to provide a special construction of the clipping edges 12, 12'. Thus, FIG. 7 illustrates an alternative possibility by a diagrammatic cross-section through the starting position of the hot mold. The inserted fibrous mat blank 4' is flat in this case. The upper mold half has an encompassing displaceable sleeve 15, which can be engaged with the lower mold half 3. The displacement of the movable, sealed sleeve 15 can take place using conventional components, such as hydraulic cylinders, which are not shown in the drawing.

FIG. 8 shows that sleeve 15 for moistening the fibrous mat blank 4' is so engaged with the lower mold half 3 that a further closed volume 13' is formed. Into this closed volume 13, external steam necessary for moistening purposes is introduced with the aid of the appropriately positioned three-way valve 10 through buffer volume 6, 6', 6".

Following the partial supply of the processing moisture to the flat fibrous mat blank, final molding takes place in the already described way. FIG. 9 shows, in a view corresponding to FIG. 4, the phase of sudden release of steam pressure, which evaporates the moisture and releases it from the volume 14 through the correspondingly positioned three-way valve 10. Sealing sleeve 15 moves back into the initial position shown in FIG. 9.

The use of a sealed displaceable sleeve 15 for producing a further closed volume into which external steam can be introduced, shown in FIGS. 7 to 9, is not in all cases possible. Particularly if the hot mold members have a complicated outline, the use of a sealed displaceable sleeve with a complicated contour is technically difficult. However, it is possible in this case to carry out moistening under pressure as follows: a further closed volume 13' is formed under a bell 16 engaging over the fibrous mat 4' and placed tightly on the associated mold half 3. As shown in FIG. 10, this bell 16 can be held in the sealed position with the aid of locking members 17 in such a way that it withstands the overpressure of the steam. Bell 16 is brought into the position shown in FIG. 10 with the mold open with the aid of conventional components, which are not shown in FIG. 10 so as to not make the latter overcomplicated. After introducing the requisite working moisture into the fibrous mat by means of three-way valve 10 in the illustrated position, the steam pressure is released suddenly from volume 13' by reversing valve 10 onto relief line 9, the locking members 17 are released again and the bell 16 is removed from the hot mold. Following the closing of valve 10, final molding and moisture removal take place in the aforementioned manner.

Figure 11:
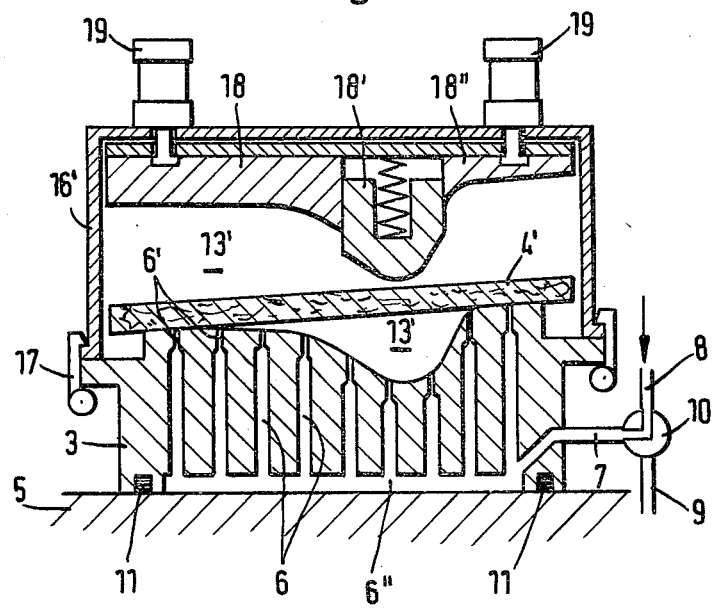
FIGS. 11 and 12 illustrate the embodiment of FIG. 10 in a different process position.
Figure 12:
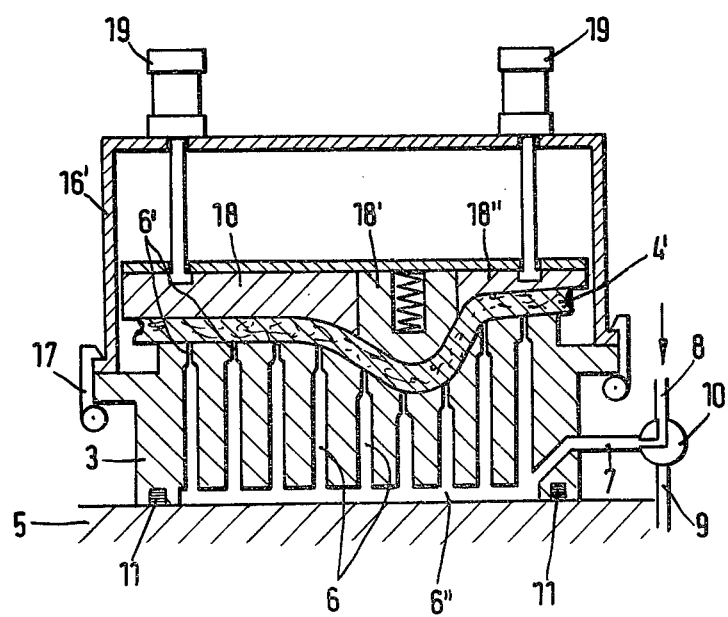

If it is necessary to preshape the flat mat blank 4' prior to the actual molding operation in order to prevent tearing or breaking of the mat during molding, the arrangement of FIG. 10 can be advantageously used in the manner shown in FIGS. 11 and 12. For this purpose, the interior of bell 16' is provided with the auxiliary molder comprising the fixed components 18, 18", as well as the leading device 18'. The complete auxiliary molder can be moved downwards with the aid of hydraulic or pneumatic cylinders 19. FIG. 11 shows the starting position for the lower mold half 3 with all the auxiliary means at the start of the additional moistening. The upper mold half 2 is not shown in this drawing so to avoid unnecessary clutter. During the additional moistening of the flat mat blank 4', the auxiliary molder 18, 18', 18" moves by steps into the position shown in FIG. 12 and preshapes the flat mat blank 4'. The auxiliary molder 18, 18', 18" is then moved back into its initial position. The additional volume 13' is relieved of steam pressure through the three-way valve 10. After release of the locking member 17, bell 16' is removed from the lower mold half 3 in the manner described hereinbefore. After closing of valve 10, the moistened and preshaped mat blank is completely molded in the described manner and the moisture is removed.

In order to prevent undesired cooling of the external steam in means according to the embodiment of FIGS. 10 to 12, the bells 16, 16' and optionally the auxiliary molders 18, 18', 18" can also be heated. This prevents undesired cooling during the time when they are not engaged with the hot mold.

The process and apparatus of this invention can also be used for processing of products other than organic fibrous mats, so long as the products contain corresponding binders. It is also possible to process binder-containing bulk materials according to this invention.

I claim:

1. In a process for molding articles from binder-containing organic fibrous mats, such as lignocellulose or the like, and containing up to 50% of thermally curable binder and having a final processing moisture content between approximately 15 and 25%, including the steps of exposing one said fibrous mat between two mold halves to a temperature above 100° C., reducing the moisture content during the molding process to a minimum of about 8%, and compressing the fibrous mat in a single mold stroke, the improvement comprising maintaining said fibrous mat between the closed mold halves, only during a minimum curing time of the added binder, the processing moisture content thereof, with said mold halves being steam tight and defining between them an article volume, accumulating the steam resulting from the processing moisture in an additional buffer volume connected to the molded article volume, and reducing the moisture content of said fibrous mat to the final moisture content by suddenly releasing the buffer volume.

2. Process according to claim 1, wherein at least part of the processing moisture of the fibrous mat is supplied by introducing external steam into the buffer volume at the start of the molding process.

3. Process according to either claim 1 or claim 2, further comprising passing external steam through the buffer volume onto the fibrous mat, and said step of reducing the moisture content including releasing said steam from the fibrous mat into the atmosphere.

4. Process according to either claim 1 or claim 2, further comprising passing external steam from the buffer volume through the fibrous mat into a further closed volume.

5. Process according to either claim 1 or claim 2, wherein processing moisture is supplied to said fibrous mat prior to the step of maintaining; and further comprising preshaping a flat fibrous mat blank during the supplying of the processing moisture.

6. Process for molding semifinished or finished articles using superatmospheric pressure and carried out at temperatures of above 100° C., from materials containing up to 50% of thermally curable binder having a processing moisture content of more than 5%, comprising compressing a workpiece formed of the material in a single mold stroke, the improvement which comprises, with the mold closed, during a minimum curing time of the binder, producing steam pressure in a closed volume which also contains the material and is maintained under pressure; following the minimum curing time, reducing the steam pressure and moisture in the molded material without any significant change to the mold temperature; maintaining the molding pressure up to the end of steam pressure reduction not below a value such as is required for maintaining the mold steam-tight and for maintaining a surface pressure, which is at least equivalent to the steam pressure in the material; and at the end of steam pressure reduction, relieving the mold from molding pressure and opening the same for removing the workpiece.

7. Apparatus for molding articles from binder-containing organic fibrous mats, such as lignocellulose or the like, and containing up to 50% of thermally curable binder and having a final processing moisture of between approximately 15 and 25%, comprising a pair of mold halves which can be sealably closed steam tight over one said fibrous mat and can be heated to an operating temperature above 100° C., and open after compressing and heating the fibrous mat so that its moisture content is reduced to a final minimum moisture content; the closed mould halves defining between them, when closed, an article volumes; means defining a buffer volume in steam communication with the molded article volume; and means for suddenly releasing the steam in said additional buffer volume to reduce the moisture in the molded fibrous mat to its final moisture content, the improvement wherein the means defining said buffer volume comprises a plurality of communicating, interconnected bores in at least one said mold half and is provided with at least one steam pressure valve for selectively maintaining and releasing said steam.

8. Apparatus according to claim 7, wherein at least one said mold half has a projecting clipping edge with a predetermined free length, and the free length of the at least one clipping edge is not greater than the thickness of the uncompressed fibrous mat.

9. Apparatus according to claim 8, wherein a further closed volume is provided in addition to the buffer volume, which further closed volume is defined by the at least one clipping edge.

10. Apparatus according to claim 7 or 8, wherein for forming a further closed volume, the apparatus further comprises a sleeve tightly surrounding the mold halves, at least when the latter are not completely closed.

11. Apparatus according to claim 8, wherein a further closed volume is provided in addition to the buffer volume, the apparatus further comprising a bell engaging over the fibrous mat disposed on one associated mold half and tightly sealable on the associated mold half to define said further closed volume.

12. Apparatus according to claim 11, wherein the bell sealable tightly over the associated mold half contains an auxiliary molder, and means for moving the auxiliary molder.

13. Apparatus according to claim 12, wherein the auxiliary molder is heatable to at least the operating temperature of the mold halves.

14. Apparatus according to claim 7, wherein one mold half has a projecting clipping edge with a free length and the mating mould half has a set-back clipping edge with a corresponding free length, the sum of the free lengths of the two clipping edges being not greater than the thickness of the uncompressed fibrous mat.

15. Apparatus according to claim 11, wherein the bell is heatable to at least the operating temperature of the mold halves.

* * * * *